(12) United States Patent
Acquaviva

(10) Patent No.: US 6,181,035 B1
(45) Date of Patent: Jan. 30, 2001

(54) PERMANENT MAGNET ELECTRIC MOTOR HAVING REDUCED COGGING TORQUE

(75) Inventor: Sebastiano Acquaviva, Pino Torinese (IT)

(73) Assignee: Motors Acquisition Corp., Southfield, MI (US)

(*) Notice: Under 35 U.S.C. 154(b), the term of this patent shall be extended for 0 days.

(21) Appl. No.: 08/314,994

(22) Filed: Sep. 29, 1994

(30) Foreign Application Priority Data

Sep. 30, 1993 (IT) .............................................. TO93A0716

(51) Int. Cl.[7] .............................. H02K 5/24; H02K 21/12
(52) U.S. Cl. ................................................ 310/51; 310/156
(58) Field of Search ........................................ 310/51, 156

(56) References Cited

U.S. PATENT DOCUMENTS

| | | |
|---|---|---|
| 3,178,599 | 4/1965 | Krupick et al. . |
| 4,030,005 | 6/1977 | Doemen . |
| 4,091,300 | 5/1978 | Lynch et al. . |
| 4,217,508 | 8/1980 | Uzuka . |
| 4,280,072 | 7/1981 | Gotou et al. . |
| 4,341,969 | 7/1982 | Sievert . |
| 4,504,755 | 3/1985 | Semones et al. . |
| 4,587,449 | 5/1986 | West . |
| 4,641,080 * | 2/1987 | Glennon et al. ...................... 310/152 |
| 4,672,253 | 6/1987 | Tajima et al. . |
| 4,701,653 * | 10/1987 | Merkle et al. ........................ 310/152 |
| 4,733,118 | 3/1988 | Mihalko . |
| 4,769,567 * | 9/1988 | Kurauchi et al. ..................... 310/156 |
| 4,994,702 | 2/1991 | Arita . |
| 4,998,032 | 3/1991 | Burgbacher . |
| 5,010,266 | 4/1991 | Uchida . |
| 5,030,864 | 7/1991 | Van Hout et al. . |
| 5,095,238 * | 3/1992 | Suzuki et al. ........................ 310/156 |
| 5,220,227 * | 6/1993 | Ohi ....................................... 310/156 |
| 5,220,228 * | 6/1993 | Sibata .................................. 310/156 |
| 5,233,250 | 8/1993 | De Filippis . |
| 5,315,198 * | 5/1994 | Torok ................................... 310/156 |
| 5,497,039 * | 3/1996 | Balettner et al. ..................... 310/51 |

FOREIGN PATENT DOCUMENTS

| | | |
|---|---|---|
| 0112636 | 7/1984 | (EP) . |
| 0169569 | 1/1986 | (EP) . |
| 0502831 | 9/1992 | (EP) . |
| 2386928 | 11/1978 | (FR) . |
| 2269232 | 11/1995 | (FR) . |
| 61-058455 | 3/1986 | (JP) . |
| 61-058456 | 3/1986 | (JP) . |
| 61-106035 | 5/1986 | (JP) . |
| 62-114454 | 5/1987 | (JP) . |
| 1-039250 | 2/1989 | (JP) . |

OTHER PUBLICATIONS

Electric Motors & Electronic Motor–Control Techniques; by I.M. Gottlieb; (No Month) 1976; H.W. Sams and Co. Inc.; Bobs–Merrill Co. Inc.; Indianapolis, Kansas City, New York; (p. 17).*

* cited by examiner

Primary Examiner—Clayton LaBalle
(74) Attorney, Agent, or Firm—Howard & Howard

(57) ABSTRACT

A brushless electric motor has a rotor carrying a plurality of permanent magnet elements uniformly spaced apart and a stator armature separated from the rotor by a circumferential air gap of uniform thickness and having a plurality of uniform slots provided therein at equally spaced intervals and facing the air gap. The cogging torque associated with the motor is reduced by bevelling the inner corners of the magnet elements and spacing the magnet elements apart at a desired spacing so as to provide a desired distribution for the density of magnetic energy stored in the air gap. Magnetic flux conductors may also be disposed on the magnet elements to affect the distribution of the density of the magnetic energy stored in the air gap.

13 Claims, 4 Drawing Sheets

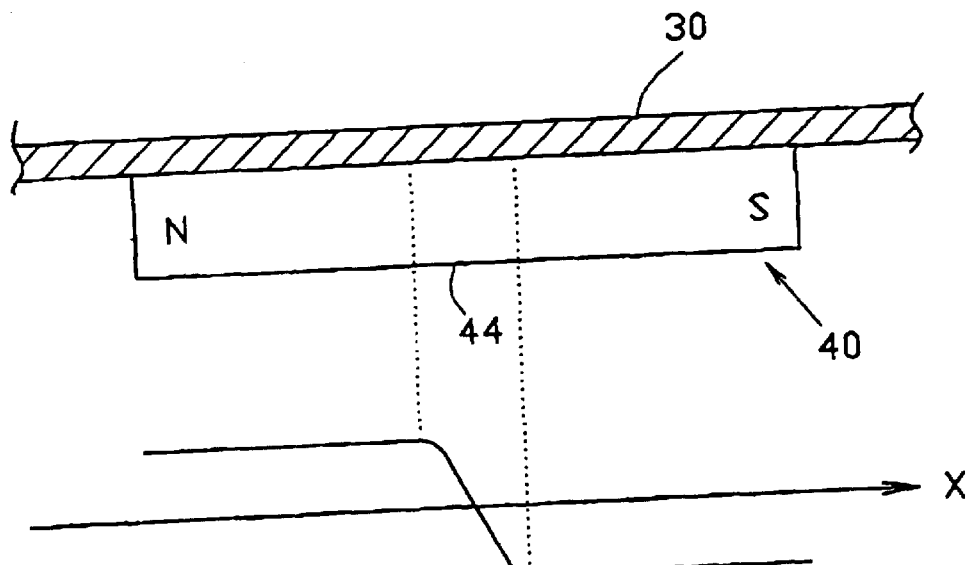
FIG. 4A
FIG. 4B
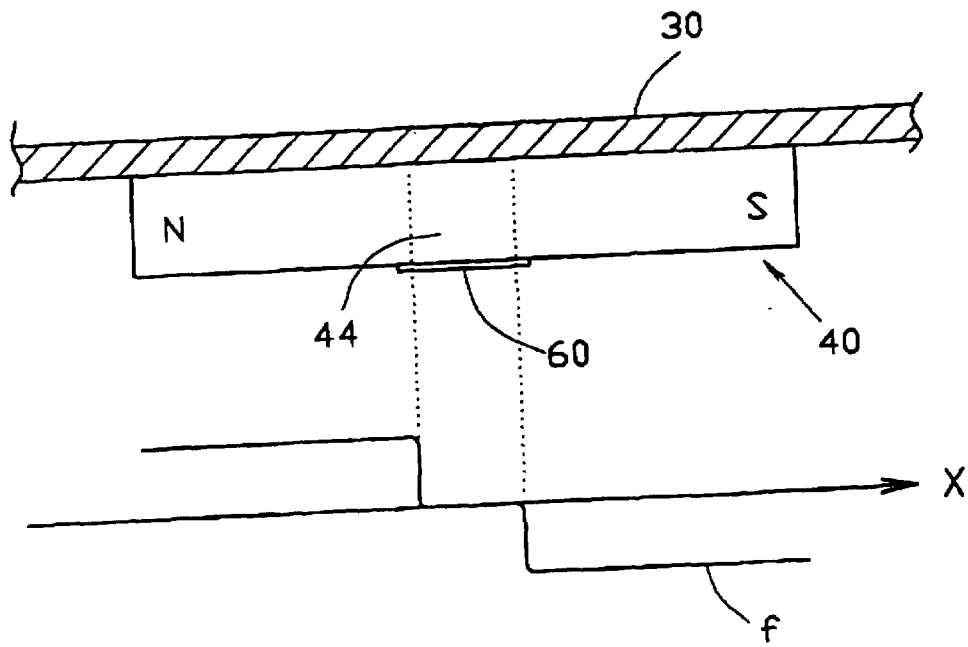
FIG. 5A
FIG. 5B

PERMANENT MAGNET ELECTRIC MOTOR HAVING REDUCED COGGING TORQUE

CROSS REFERENCE TO RELATED APPLICATION

This application relates to the following patent application filed on the same date: U.S. application Ser. No. 08/314,995, filed Sep. 29, 1994 for Method and Apparatus for Controlling a Brushless Electric Motor by Sebastiano Acquaviva.

TECHNICAL FIELD

The present invention relates generally to permanent magnet electric motors and, more particularly to the reduction or elimination of cogging torque in permanent magnet electric motors, particularly in brushless motors, by changing the shape and arrangement of the magnets.

Conventional permanent magnet motors are subjected to a reluctance torque, also known as a cogging torque, that results in an oscillation of the torque produced by the motor itself. This torque is due to periodic interactions between the magnetic field in the air gap created by the inductor (in this case by the permanent magnets) and because of the non-uniformity of the permeance of the magnetic circuit of the armature framework or the stator which is typically provided with channels or slots for housing the windings.

Generally, cogging torque exists because the magnetic energy that is stored in the air gap varies according to the rotor's angular position with respect to the stator. Since cogging torque is naturally undesirable, the designers of brushless motors have developed systems to reduce it. Typically, this reduction in cogging torque is accomplished by disrupting the periodicity of the magnetic field. It is known that the cogging torque may be reduced by making the slots in the armature extend obliquely along the motor's main rotation axis, such as by staggering the laminated iron sheets forming the armature. It is also possible to reduce the cogging torque by varying the width and spacing of the permanent magnets or the slots in the rotor. Although methods of this type are effective in reducing cogging torque, they have the disadvantage of also reducing the torque produced by the motor and increasing the motor's production cost.

SUMMARY OF THE INVENTION

It is an object of the present invention to provide a permanent magnet motor having a reduced or eliminated cogging torque while having a cost and complexity similar to conventional motors.

A permanent magnet motor is provided comprising a rotor rotatable about a central motor axis and a stator armature supporting the motor windings disposed coaxially with the rotor and separated from the rotor by a circumferential air gap. The rotor carries a plurality of permanent magnet elements arranged to provide an angular distribution of alternating magnetic polarity about the rotor. The stator armature has a number of slots formed therein facing the air gap and disposed at equally spaced intervals about the stator as in conventional practice, the slots house the motor windings. In accordance with one aspect of the present invention, the permanent magnet elements are shaped and arranged such that the distribution of the density of magnetic energy that is stored in the air gap in the absence of stator slots, as a function of a linear coordinate taken along a circumference disposed within the air gap and coaxial to the motor axis, exhibits an increasing transition in magnitude in a first angular position near a first end of a magnetic polarity and a decreasing transition in magnitude in a second angular position near a second end of the magnetic polarity, the transitions being asymmetrical with respect to each other and the density of magnet energy being substantially constant between consecutive transitions. Additionally, the slots of the stator are disposed in positions whereby during operation, when a first slot is in a first angular position corresponding to the first angular position of the increasing transition in magnitude of the distribution of magnetic energy density, a second slot is in a second angular position that corresponds to the second angular position of the decreasing transition in magnitude of the distribution of magnetic energy density, each slot functioning to modify the distribution of the density of magnetic energy in the air gap according to a modulation function which has a local development symmetrical to a radial plane passing through the center of the slot.

In a further aspect of the present invention, each of the permanent magnet elements is shaped as an arcuate segment subtending an angular aperture, $\beta$, where:

$$\beta = K(360°/n_c) + (4/p)(1 - 1/(5p^{(3P-2)/2}))$$

wherein:

p is the number of pairs of magnet elements;

$n_c$ is the number of slots; and $K = 1, 2, \ldots ((n_c/2p) - 1)$, and $n_c/2p$ is an integer greater than 1.

Further, the permanent magnet elements advantageously have radially inward corners which are bevelled at an angle of about 45 degrees and, preferably, are bevelled to a depth of about one and one-half times the radial width of the air gap. In a further aspect of the present invention, the permanent magnet elements are disposed circumferentially about the rotor and spaced apart at equal intervals of spacing, the interval of spacing between adjacent permanent magnet elements being approximately equal to the quantity (kp−3w), where k is a selected positive integer, p is the center to center spacing between adjacent slots, and w is the radial width of the air gap.

In a still further aspect of the present invention, each of the permanent magnet elements comprises an N pole and an S pole disposed at opposite ends of the magnet element and has a polarity transition region between the N pole and the S pole, and an axially extending groove disposed within the polarity transition region and facing the air gap. In a still further aspect of the present invention, each of the permanent magnet elements comprises an N pole and an S pole disposed at opposite ends of the magnet element and has a polarity transition region between the N pole and the S pole, and a magnetic flux conductor, such as for example a steel plate, disposed on the face of the magnet element facing the air gap so as to extend across the polarity transition region.

Most advantageously, each of the permanent magnet elements comprises an N pole and an S pole disposed at opposite ends of the magnet element and has a polarity transition region between the N pole and the S pole, an axially extending groove disposed within the polarity transition region and facing the air gap, and a magnetic flux conductor element disposed on the face of the magnet element facing the air gap so as to extend across the groove.

BRIEF DESCRIPTION OF THE DRAWINGS

Further objects and advantages of the present invention will become evident from the following detailed description, with reference being made to the accompanying drawing, which are meant to be exemplary, but not limiting, of the present invention, wherein:

FIG. 4a is an end elevational view of a section of an alternate embodiment of a typical inductor pole in a conventional permanent magnet motor;

FIG. 4b is a graphical representation illustrating the variation, along an axis extending along the air gap, of the density of the magnetic energy generated by an inductor pole inside the air gap in the motor of FIG. 4a;

FIG. 5a is an end elevational view of a section of a further alternate embodiment of an inductor pole in a permanent magnet motor designed in accordance with a further aspect of the present invention extending along a circumferential axis about the air gap;

FIG. 5b is a graphical representation illustrating the variation, along an axis extending along the air gap, of the density of the magnetic energy generated by an inductor pole inside the air gap in the motor of FIG. 5a;

DETAILED DESCRIPTION OF A PREFERRED EMBODIMENT

It has been demonstrated mathematically and confirmed using finite element models that no cogging torque is generated if the permanent magnets forming the inductor and the structure of the stator are in accordance with the present invention. More specifically, in accordance with the present invention, the permanent magnets are shaped such that the density of the magnetic energy is not modulated, (which is proportional to the square of the magnetic induction B that would exist in the air gap if the stator armature did not have slots or channels). The shape of the magnets conforms to particular symmetry requirements which will be later described in greater detail. Furthermore, the structure of the stator is such that the function of the magnetic permeance in the air gap has a path that is substantially equal to the axes of the slots.

Figure 1:
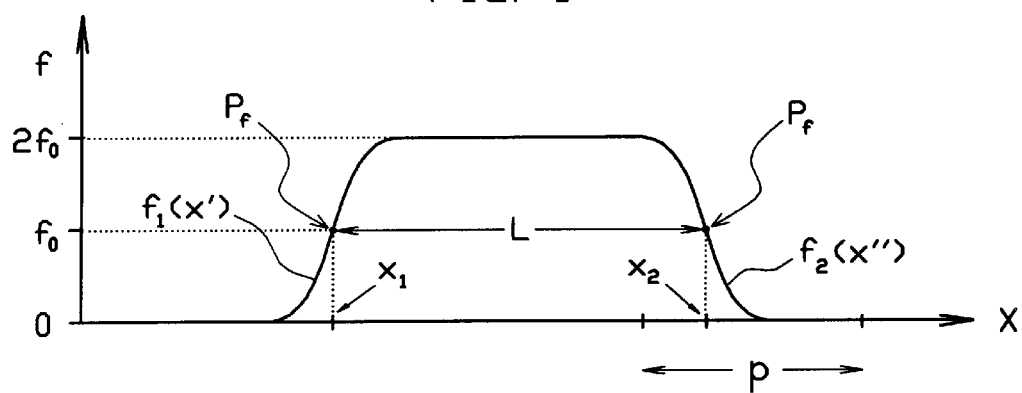
FIG. 1 is a graphical representation illustrating the variation, along an axis extending along the air gap, of the density of the magnetic energy generated by an inductor pole inside the air gap in a motor having an armature framework (stator) without channels or slots therein.

In accordance with one aspect of the present invention, the individual permanent magnets forming an inductor segment of the motor must be sufficiently separated, that is circumferentially spaced at a sufficient interval, that f=0 and f'=0 (where f is a function defining the magnetic energy density in the air gap along a circumference thereabout centered on the motor's axis and f' is the first derivative of f) at least one point in the interval separating two adjacent magnets. The function f for the density of the resulting magnetic energy f associated with a single magnet with a uniform thickness in the central zone is illustrated in FIG. 1.

As depicted, in the central zone corresponding to the magnet, f has a substantially constant value ($2f_0$), but near the two ends of the magnet, f drops virtually to zero along two symmetrical curves that are essentially of the same sigmoid. Henceforth, the sigmoid on the left end (in FIG. 1) will be referred to as $f_1(x')$ and the sigmoid on the right end will be called $f_2(x'')$, where x' and x'' represent coordinates measured along the x axis and whose points of origin are $x_1$ and $x_2$ respectively. In other words, they represent the abscissa of the point of inflection $P_f$ of their respective sigmoid. The value of f at each point of inflection $P_f$ is indicated by $f_0'$ and the distance between the two flex points is designated L.

In order to reduce the cogging torque to a very low level, it is sufficient that $f=2f_0$ between the sigmoids, i.e. in correspondence with the magnets, that f=a constant outside the sigmoids, and that L=np. In order to completely eliminate the cogging torque, it is also necessary that the functions $f_1(x')$ and $f_2(x'')$ be asymmetrical with respect to the straight lines $y=-x+Y_1$ and $y=x+Y_2$ respectively. The values $Y_1$ and $Y_2$ must be defined so that the straight lines pass through the flex points of each sigmoid respectively for L=np, where p is the distance between the centers of two adjacent slots in the stator, and n is a positive integer (n=1,2,3, ...), and for the functions $f_1(x')$ and $f_2(x'')$ to be given by $f_1(x')=f_0(1+s(x'))$ and $f2(x'')=f_0(1-s(x''))$, where s(x) can be any odd function with a short range and uniform width. This simply means that s(x)=-s(-x) and that s(x)=1 for larger values of x, in this case for x>=a, where a<=p; a being the value of x through which zero is derived.

Figure 2:
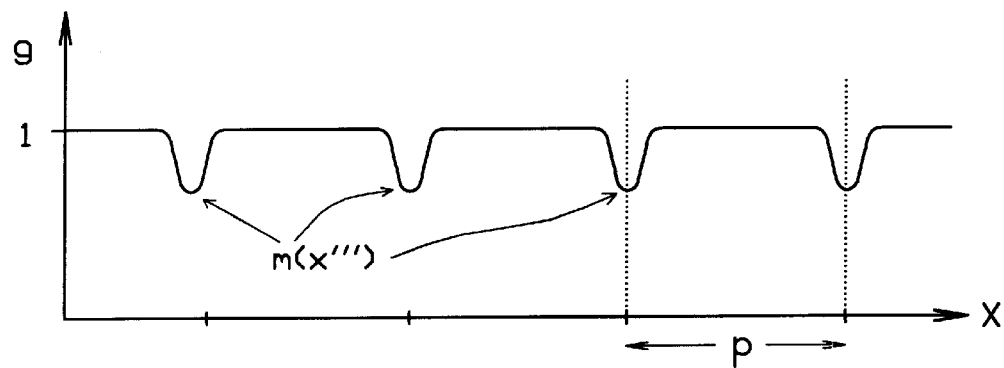
FIG. 2 is a graphical representation illustrating the variation, along an axis extending along the air gap, of a modulation function, g, of the magnetic energy in the air gap due to the presence of slots in the armature framework (stator)

If, as depicted in FIG. 2, the function of permeance g(x) is symmetric with respect to the axes of the respective slots in the stator armature, the induction in the iron plate of the stator armature remains below the knee joint of its magnetic characteristic B(H). If this does not occur, the function g(x) can become distorted as a result of which the cogging torque will not be completely eliminated although it will be considerably reduced. The cogging torque disappears if both of these requirements are satisfied.

The total magnetic energy is given by the integral of the product f(x) times g(x) along the air gap, where the function of permeance g(x) comprises a modulation function that represents the effects of the reluctance of the slots in the stator on the density of magnetic energy. As illustrated in FIG. 2, it is reasonable to assume that inside any slot $g(x''')=1-m(x''')$, where x''' is the distance along the air gap from the center of the slot, and m (x''') represents the modulation depth, which is canceled out beyond the slot's edges or borders. The integral of the product f(x) times g(x) only varies for rotor angles for which m(x''') exceeds one of the sigmoids of f, such as $f_1$(x') for example. But, if this happens, $f_2$(x'') exceeds m(x'''+L) by an identical amount. Now L=np, and thus m(x'''+L)=m(x''') and the integration $f_1$(x') m(x''')+$f_2$(x'')m(x'''+L) reduces to $2f_0$m(x''') which is independent from x. It should also be noted that if the rotor is positioned outside of the overlapping region, then the term of the integration becomes $2f_0$m(x''') and the other term becomes zero, depending on the direction of rotation. In this way, the integral becomes independent of the rotor's angle if f has the prescribed symmetry.

Another way to prove that the total magnetic energy is independent of the angle of the rotor is by means of Fourier analysis. Given the symmetry of f, its Fourier components can only include its continuous components and the odd spacial frequencies $\pi/p$, $3\pi/p$, $5\pi/p$, and so on. Conversely, the Fourier components of g can only include its continuous components and the even spacial frequencies $2\pi/p$, $4\pi/p$, and so on. Naturally, the integral is reduced to a constant, that is, the integrated product of the continuous components.

Figure 3:
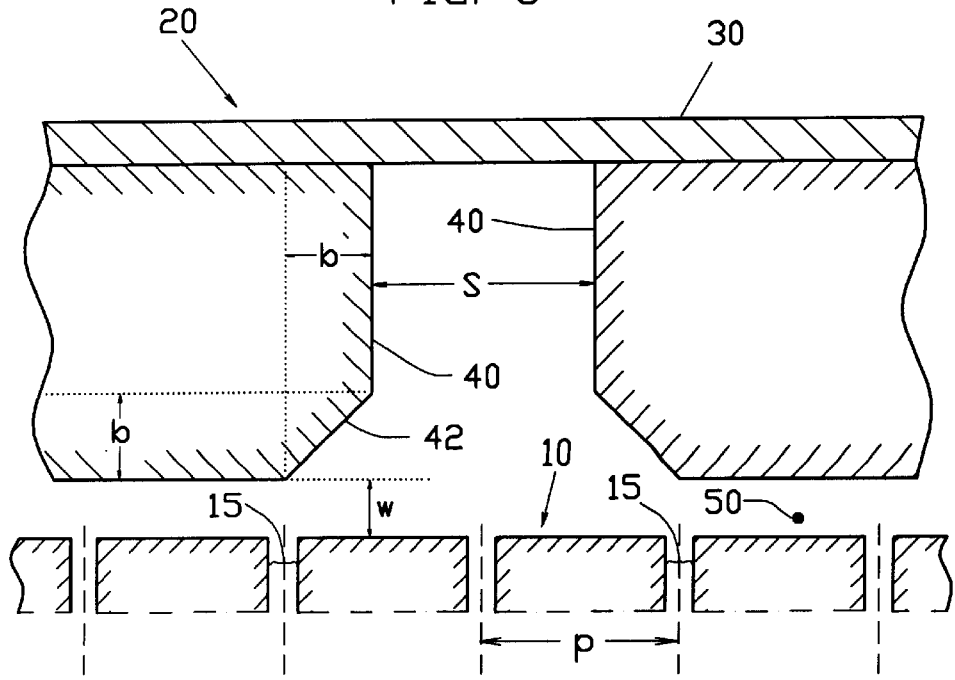
FIG. 3 is an end elevational view of a section of one embodiment of a permanent magnet motor, depicted in an ideal linear development, designed in accordance with one aspect of the present invention.

Referring now to FIG. 3, there is depicted therein a circumferential section (linearized for convenience) of a brushless electric motor having an exemplary embodiment of inductor segments comprising permanent magnets 40 shaped in accordance with the present invention. As depicted therein, the permanent magnet brushless electric motor contains a stator 10 and a rotor 20. The rotor 20 comprises a support housing 30 adapted for rotation about a central motor axis (not shown) and a plurality of permanent magnets 40 mounted on and about the inner circumference of the housing 30, and separated by equally spaced, circumferentially extending intervals of a distance S. Extending circumferentially about the stator 10 and between the radially inward surface of the permanent magnets 40 and the outer surface of the stator 10 is an air gap 50 having a width w. The stator 10 has a plurality of substantially axially extending for housing the motors windings formed therein, which face the air gap and are circumferentially spaced center to center at equal intervals of a distance p.

In accordance with one aspect of the present invention, the magnets 40 are configured such that the radially inward end corners 42 of the magnets are smoothed or bevelled to a depth of about 1.5w, where w is the radial width of the air gap 15, at a bevel angle of approximately 45 degrees, and the distance S between two adjacent magnets 40 is approximately equal to kp–3w, where k is a positive integer selected by the motor's designer. The required spacing between circumferentially adjacent magnets 40 is minimized while maintaining the asymmetrical requirement of $f_1$(x) and $f_2$(x), by starting with the value k=1 when determining the value of k for a particular motor configuration. This will minimize the space between the magnets and therefore create a motor with greater main thrust and with superior performance. Nevertheless, if the distance between the magnets as determined above, is reduced too much, then the asymmetrical requirement of $f_1$(x) and $f_2$(x) cannot be satisfied. In this case, it is necessary to modify the magnet's design (if possible) or to select a higher value for k. Further, the distance S between the magnets 40 can be reduced by cutting additional slots 15, as dummy slots, in stator armature 10 in order to reduce the distance p between the slots 15.

Accordingly, in order to obtain the desired distribution, it is necessary that the shape of the magnets 40 be extremely accurate since the distribution depends considerably on the shape of the magnets. In practice, it is generally not easy (and is expensive) to manufacture magnets by sintering with a very tight dimensional tolerances. In accordance with a further aspect of the present invention, the desired distribution of the density of magnetic energy in the air gap 15 can be advantageously generated using magnetic flux conduction methods with a low cost and a simple procedure.

In FIGS. 4 through 10, the elements already described hereinbefore are referred to with the same reference letters and/or reference numerals as used in the preceding figures. In FIG. 4a, there is depicted an inductor segment comprising a permanent magnet 40 in ideal linear development, placed so as to create two inductor polarities, indicated with N and S, opposite the stator (not shown). The development of magnetic energy density for the magnet 40 of FIG. 4a is represented by the function f, relative to an axis along the air gap, as depicted in FIG. 4b. In FIG. 5a, there is depicted an inductor segment comprising a permanent magnet 40, which itself is identical to the permanent magnet 40 of FIG. 4a, and a magnetic flux conductor element 60 which is disposed on the central region of the permanent magnet 40, that is the transition area 44 that separates the two magnetic poles N and S. The presence of the magnetic flux conductor element 60 alters the distribution path of magnetic energy from that shown in FIG. 4b to the desired distribution depicted in FIG. 5b. The magnetic flux conductor element 60 may comprise a plate or a laminated sheet made of steel or other type of material that conducts magnetic flux. The conductor element 60 functions to itself conduct magnetic flux in the transition between the two polarities N and S of the permanent magnet 40, thereby short circuiting the magnetic flux, thus ensuring, in accordance with the present invention, that the distribution f is zero and its first derivative f' is zero in this transition region.

Figure 6:
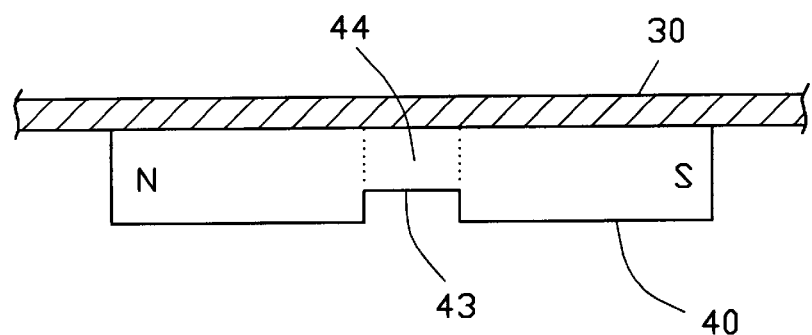
FIG. 6 is an end elevational view of a section of a still further alternate embodiment of an inductor pole in a permanent magnet motor designed in accordance with a further aspect of the present invention extending along a circumferential axis about the air gap.
Figure 7:
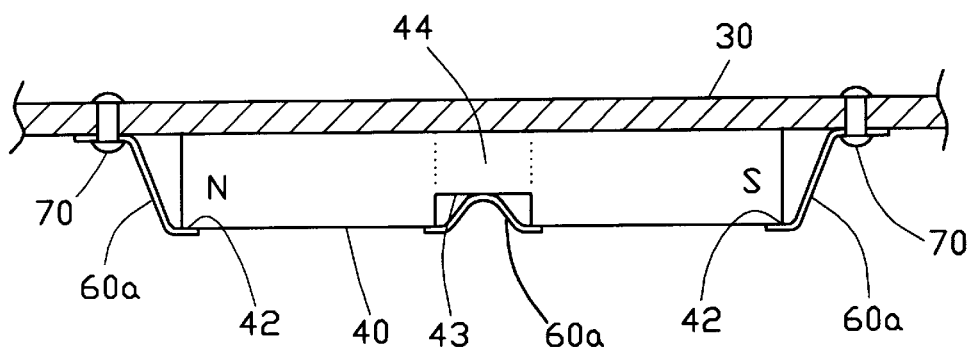
FIG. 7 is an end elevational view of a section of a still further alternate embodiment of an inductor pole in a permanent magnet motor designed in accordance with a further aspect of the present invention extending along a circumferential axis about the air gap.
Figure 8:
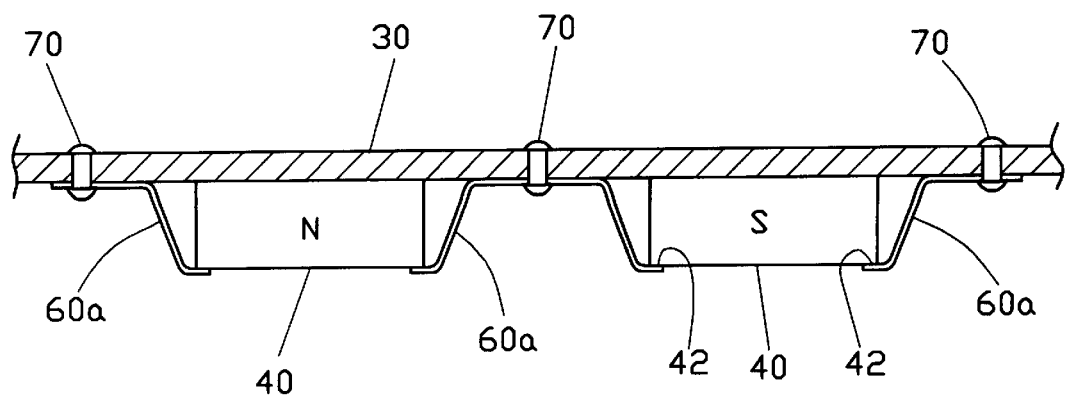
FIG. 8 is an end elevational view of a section of a still further alternate embodiment of an inductor pole in a permanent magnet motor designed in accordance with a further aspect of the present invention extending along a circumferential axis about the air gap.

Further alternate embodiments of an inductor segments, each of which comprise a conventional permanent magnet 40 adapted in accordance with the present invention to alter the distribution of the density of the magnetic energy to the desired distribution are depicted in FIGS. 6 through 8. In FIG. 6, there is depicted a permanent magnet 40 wherein the desired distribution path is obtained by providing a notch or groove 43, having a substantially rectangular shape, along the axial length of the permanent magnet 40 and disposed within the transition region 44 of the permanent magnet 40. In FIG. 7, there is depicted a still further embodiment of the inductor segment comprising a permanent magnet 40 having not only a notch or groove 43 provided in the transition region 44 thereof, but also having a magnetic flux conductor 60 disposed in the transition region 44 thereof so as to extend across the notch or groove 43. In addition, in order to obtain the desired distribution function f near the two ends of the permanent magnet 40, additional magnetic flux conductor elements 60a are mounted to the support housing 30 at both ends of the magnet 40 so as to overlap the corners 42 of the magnet 40. The magnetic flux conductor elements 60a cause the magnetic flux to be short-circuited near the end of the permanent magnet 40 to housing 30. The conductor elements 60a also are adapted to securely hold the magnet 40 on the housing 30. In fact, the outboard ends of the conductor elements 60a have a flange portion which is secured to the support housing 30 by rivets 70 or other fastening means. In FIG. 8, a still further alternative embodiment of an inductor segment is depicted which comprises paired, circumferentially spaced, individual permanent magnet element 40N and 40S which comprise N and S poles respectively. As depicted therein, magnetic flux conductor elements 60a are provided at both ends of each of the magnet elements 40N and 40S to connect the individual magnet elements 40N and 40S together and, in the manner discussed hereinbefore with respect to the embodiment depicted in FIG. 7, to ensure that the desired distribution function f for the density of the magnetic energy f is obtained near the ends of each of the individual magnet elements.

Figure 9:
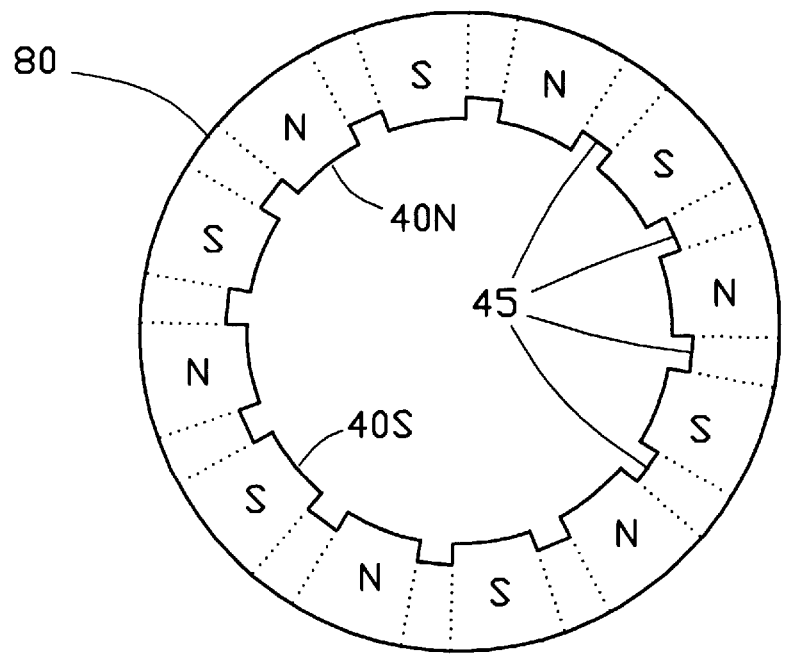
FIG. 9 is an end elevational view of a motor inductor in a motor incorporating a series of inductors of the type depicted in FIG. 6.
Figure 10:
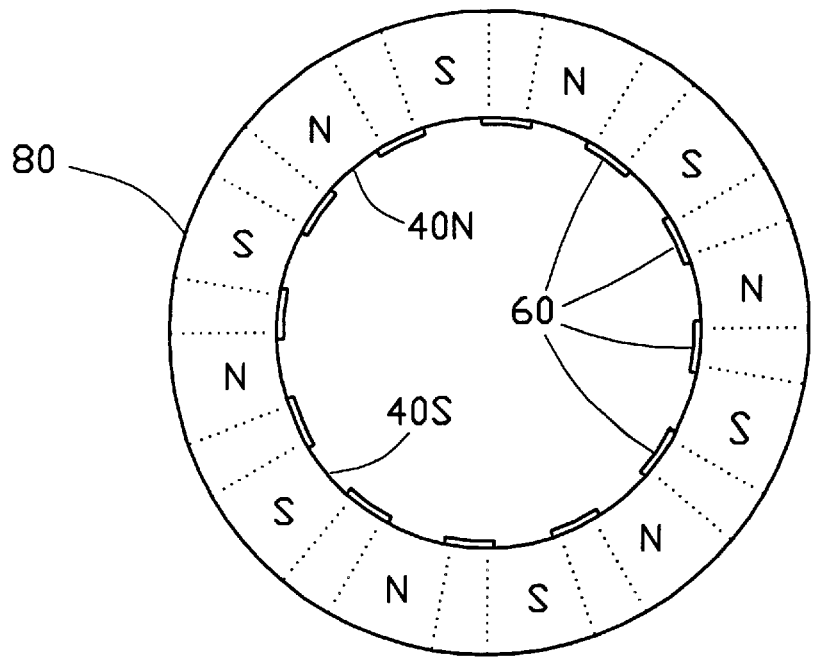
FIG. 10 is an end elevational view of a motor inductor in a motor incorporating a series of inductors of the type depicted in FIG. 7.

In applications for permanent magnet brushless electric motors, it is desirable to provide the complete distribution of the inductor's magnetic pole using a tubular inductor element having permanent magnetization zones and opposite signs. In FIGS. 9 and 10, there are depicted (in axial view) two tubular, monolithic permanent magnet inductor elements 80 that were obtained by sintering using the aspects of the present invention discussed hereinbefore with respect to the inductor embodiments shown in FIG. 6 and FIG. 5, respectively. In the embodiment depicted in FIG. 9, the tubular inductor element 80 comprises a substantially cylindrical shell having a plurality of arcuate permanent magnetization zones 40N and 40S disposed in alternating polarity sequence about the circumference of the cylindrical shell and having a plurality of axially extending notches or grooves 45 cut in the inner surface of the shell with one notch or groove 45 disposed in the transition region 45 between each set of adjacent permanent magnetization zones 40N and 40S.

In the embodiment depicted in FIG. 10, the tubular inductor element 80 comprises a substantially cylindrical shell of uniform radial thickness having a plurality of arcuate permanent magnetization zones 40N and 40S disposed in alternating polarity sequence about the circumference of the cylindrical shell and having a plurality of magnetic flux conductor elements 60 disposed on the inner surface of the cylindrical shell in the transition region 45 between each set of adjacent permanent magnetization zones 40N and 40S. A tubular inductor may also be readily constructed as a monolithic centered, cylindrical shell having permanent magnetization zones of alternate polarity with notches or grooves provided between each set of adjacent magnetization zones and with magnetic flux conductor elements disposed across each of the grooves, such as in the manner similar illustrated in FIG. 7.

The following formulas are exemplary of a procedure that may be used to determine the optimal angular aperture of a generic magnet of the motor to ensure that the cogging torque will be substantially reduced. The angular aperture of a magnet, $\beta$, expressed in degrees is given by the formula:

$$\beta = K(360°/n_c) + (4/p)(1 - 1/(5p^{(3P-2)/2}))$$

where: p is a constant equal to the number of pairs of poles (that is the number of magnet elements), the magnet elements are equally and evenly spaced, and $n_c$ is the number of slots (real or dummy) on the air gap, and:

$$K = 1, 2, \ldots (n_c/2p-1)$$

where $n_c/2p$ is an integer greater than 1.

For example, for a motor having a stator with 24 real slots and 24 dummy slots and four pairs of magnet elements, then $n_c=48$ and $p=4$. The maximum magnetic flux of the pole is obtained when the angular aperture, $\beta$, as large as possible. That is when:

$$K = n_c/2p - 1 = 48/8 - 1 = 6 - 1 = 5.$$

The angular aperture, $\beta$, is therefore:

$$\beta = 5(360°/48) + (4/4)(1 - 1/(5(4^5))) = 38.5°$$

Therefore, the magnets to be used should have an angular aperture of about 38.5°. This value also applies when the armature reactions occur.

What is claimed is:

1. An improved permanent magnet motor having reduced cogging torque, the improved permanent magnet motor comprising:
   a rotor rotatable about a central motor axis and having a plurality of permanent magnet elements disposed at equally spaced intervals, the magnet elements providing an angular distribution of the magnetic polarity about the rotor;
   motor windings; and
   a stator disposed coaxially with the rotor and separated from the rotor by a circumferential air gap and having a number of slots formed therein for housing the motor windings, the slots facing the air gap, wherein:
      the permanent magnet elements are shaped and arranged such that the distribution of the density of magnetic energy that is stored in the air gap in the absence of stator slots, as a function of a linear coordinate taken along a circumference disposed within the air gap and coaxial to the motor axis, exhibits an increasing transition in magnitude in a first angular position near a first end of a magnetic polarity and a decreasing transition in magnitude in a second angular position near a second end of the magnetic polarity, the transitions being asymmetrical with respect to each other and the density of magnet energy being substantially constant between consecutive transitions; and
      the slots of the stator are disposed in positions such that during operation, if a first slot is in a first angular position corresponding to the first angular position of the increasing transition in magnitude of the distribution of magnetic energy density, a second slot is in a second angular position that corresponds to the second angular position of the decreasing transition in magnitude of the distribution of magnetic energy density, each slot functioning to modify the distribution of the density of magnetic energy in the air gap according to a modulation function which has a local development symmetrical to a radial plane passing through the center of the slot.

2. A permanent magnet motor as recited in claim 1 wherein each of the permanent magnet elements is shaped as an arcuate segment subtending an angular aperture, $\beta$, where:

$$\beta = K(360°/n_c) + (4/p)(1 - 1/(5p^{(3P-2)/2}))$$

wherein:
   p is the number of pairs of magnet elements;
   $n_c$ is the number of slots; and
   $K = 1, 2, \ldots ((n_c/2p)-1)$, and
   $n_c/2p$ is an integer greater than 1.

3. A permanent magnet motor as recited in claim 2 wherein each of the permanent magnet elements has radially inward corners at each of its ends which are bevelled at an angle of about 45 degrees.

4. A permanent magnet motor as recited in claim 3 wherein the air gap has a substantially uniform radial width and each of the radially inward corners is bevelled to a depth of about one and one-half times the radial width of the air gap.

5. A rotor and stator assembly for use in a permanent magnet motor, said rotor and stator assembly comprising a rotor mounted for rotation about a central axis and supporting a plurality of permanent magnet elements disposed circumferentially about the rotor and spaced apart at equal intervals of spacing thereby providing an angular distribution of magnetic polarity alternating between N and S poles; and a stator separated radially from the permanent magnet elements of said rotor by an air gap having a width, w, in the radial direction, said stator having a plurality of slots formed therein facing the air gap and circumferentially spaced about the stator at equally spaced intervals of a distance, p; the interval of spacing between adjacent permanent magnet elements being approximately equal to the quantity (kp−3w), where k is a selected positive integer.

6. A rotor and stator assembly as recited in claim 5 wherein each of the permanent magnet elements is shaped as an arcuate segment subtending an angular aperture, $\beta$, where:

$$\beta=K(360°/n_c)+(4/p)(1-1/(5p^{(3P-2)/2}))$$

wherein:

p is the number of pairs of magnet elements;

$n_c$ is the number of slots; and

K=1,2, . . . ((n$_c$/2p)−1), and n$_c$/2p is an integer greater than 1.

7. A rotor and stator assembly as recited in claim 5 wherein each of the permanent magnet elements has radially inward corners at each of its ends which are bevelled at an angle of about 45 degrees.

8. A rotor and stator assembly as recited in claim 7 wherein the air gap has a substantially uniform radial width and each of the radially inward corners is bevelled to a depth of about one and one-half times the radial width of the air gap.

9. A rotor and stator assembly as recited in claim 5 wherein each of the permanent magnet elements comprises an N pole and an S pole disposed at opposite ends of the magnet element and has a polarity transition region between the N pole and the S pole; and an axially extending groove disposed within the polarity transition region and facing the air gap.

10. A rotor and stator assembly as recited in claim 5 wherein each of the permanent magnet elements comprises an N pole and an S pole disposed at opposite ends of the magnet element and has a polarity transition region between the N pole and the S pole; and a magnetic flux conductor disposed on the face of the magnet element facing the air gap so as to extend across the polarity transition region.

11. A rotor and stator assembly as recited in claim 10 wherein the magnetic flux conductor is comprised of a steel plate.

12. A rotor and stator assembly as recited in claim 5 wherein each of the permanent magnet elements comprises an N pole and an S pole disposed at opposite ends of the magnet element and has a polarity transition region between the N pole and the S pole; an axially extending groove disposed within the polarity transition region and facing the air gap; and a magnetic flux conductor element disposed on the face of the magnet element facing the air gap so as to extend across the groove.

13. A rotor and stator assembly as recited in claim 12 wherein the magnetic flux conductor is comprised of a steel plate.

* * * * *